United States Patent
Murphy (10) Patent No.: US 6,421,044 B2
(45) Date of Patent: *Jul. 16, 2002

(54) PERIPHERAL INPUT DEVICE WITH A RETRACTABLE CORD

(75) Inventor: Stephen C. Murphy, Payette, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/069,727

(22) Filed: Apr. 29, 1998

(51) Int. Cl.$^7$ .............................. G09G 5/08; H01R 3/00; G06F 1/16
(52) U.S. Cl. .................... 345/163; 439/164; 361/686
(58) Field of Search ................................ 345/156, 157, 345/161, 163, 167, 168, 179; 242/370, 378.2, 373, 375, 396.9, 378.1, 378.3, 378.4; 439/162, 164, 501; 191/12.4, 12.2 R; 361/686, 600, 601

(56) References Cited

U.S. PATENT DOCUMENTS

| | | | |
|---|---|---|---|
| 3,657,491 A | * 4/1972 | Ryder et al. ............ 191/12.2 R |
| 3,826,879 A | * 7/1974 | Penn et al. ................ 191/12.4 |
| 4,901,938 A | 2/1990 | Cantley et al. ........... 342/376.1 |
| 4,946,010 A | * 8/1990 | DiBono ....................... 439/501 |
| 5,094,396 A | * 3/1992 | Burke ...................... 242/378.2 |
| 5,339,213 A | 8/1994 | O'Callaghan ............... 361/683 |
| 5,398,895 A | 3/1995 | Whetherhult et al. ......... 248/51 |
| 5,535,960 A | 7/1996 | Skowronski et al. .... 242/378.4 |
| 5,579,657 A | 12/1996 | Makous ......................... 70/15 |
| 5,655,143 A | * 8/1997 | Alpert et al. ................ 361/600 |
| 5,669,571 A | 9/1997 | Graybill ................... 242/378.1 |
| 5,670,989 A | * 9/1997 | Owen ......................... 345/163 |
| 5,671,833 A | * 9/1997 | Edwards et al. ........... 191/12.4 |
| 5,701,981 A | * 12/1997 | Marshall et al. ............ 439/501 |
| 5,750,934 A | 5/1998 | Kuljis ........................ 174/135 |
| 5,797,558 A | * 8/1998 | Peterson et al. ............ 242/373 |
| 5,819,893 A | * 10/1998 | Wagner et al. ............. 191/12.4 |
| 5,844,775 A | 12/1998 | Lundberg .................... 361/683 |
| 6,011,686 A | * 1/2000 | Grasso et al. ............... 361/686 |
| 6,014,110 A | * 1/2000 | Lai .......................... 242/396.9 |
| 6,019,304 A | * 2/2000 | Skowronski et al. ....... 242/373 |
| 6,043,807 A | * 3/2000 | Carroll ....................... 345/163 |
| 6,102,173 A | * 8/2000 | Tuttlebee ............... 191/12.2 R |
| 6,163,326 A | * 12/2000 | Klein et al. .................. 345/156 |

FOREIGN PATENT DOCUMENTS

| | | | | |
|---|---|---|---|---|
| JP | 405002400 | 6/1991 | ............ G06F/1/16 |
| JP | 405303469 | 11/1993 | ............ G06F/3/003 |
| JP | 408030386 | 7/1994 | ............ G06F/3/033 |
| JP | 09204271 | * 8/1997 | ............ G06F/3/33 |

OTHER PUBLICATIONS

Jeffrey A. Pyle, U.S. application No. 09/069,728, filed Apr. 29, 1998, entitled "A Method for Entering Data Into a Computer Using a Peripheral Input Device Having a Retractable Cord".

* cited by examiner

*Primary Examiner*—Steven Saras
*Assistant Examiner*—Paul A. Bell
(74) *Attorney, Agent, or Firm*—Troop, Pruner & Hu, P.C.

(57) ABSTRACT

The invention, in one embodiment, is a peripheral input device including a body, the body further including an input mechanism; an electrical cord operably connected to the body through which input from the input mechanism can be transmitted; and a spool biased to rotate and retract the electrical cord; and an anchor for the electrical cord.

10 Claims, 6 Drawing Sheets

PERIPHERAL INPUT DEVICE WITH A RETRACTABLE CORD

This application is related to U.S. patent application Ser. No. 09/069,728, filed on Apr. 29, 1998, and entitled, "A METHOD FOR ENTERING DATA INTO A COMPUTER USING A PERIPHERAL INPUT DEVICE HAVING A RETRACTABLE CORD."

BACKGROUND OF THE INVENTION

1. Field of the Invention

This invention relates generally to a peripheral input/output device and more particularly, to a peripheral input device with a retractable cord.

2. Description of the Related Art

People typically interface with computers using a variety of peripheral input devices. A computer therefore commonly is equipped with one or more of a keyboard, a touchpad, a joystick, and/or a mouse. Such peripheral input devices typically are equipped with rather long electrical cords to provide flexibility for the computer's user. This flexibility is useful both for configuring the computer equipment for operation and for operating the peripheral devices.

The length of the electrical cord sometimes causes problems. Consider, for instance, a keyboard with a long cord permitting the user to sit at a location somewhat removed from the computer chassis. The cord is played out to permit the user to sit at a distance and, if the user moves closer to the computer, the slack in the cord can become bothersome and the user might have to divert their attention to removing the slack from the immediate work area. The diversion hampers productivity by occupying the user's attention and time and, sometimes, by interrupting the user's train of thought.

The problem may be exacerbated when using a mouse. As the mouse is moved over the desktop to position a pointer or cursor on the screen, the electrical cord is played out and, sometimes, slackened. The slack cord may then actually interfere with using the mouse by occupying desktop over which the mouse must be moved. The slack cord problem is further complicated for a mouse in that the slack will probably be needed very quickly to reposition the mouse. The option of simply stopping and removing the slack is therefore much less palatable.

Thus, there is a need for a new mechanism for managing the slack in the electrical cord of a peripheral input device. The present invention is directed to overcoming, or at least reducing the effects of, one or more of the problems set forth above.

SUMMARY OF THE INVENTION

The invention, in one embodiment, is a peripheral input device comprising a body including an input mechanism; an electrical cord operably connected to the body through which input from the input mechanism can be transmitted; a spool biased to rotate and retract the electrical cord; and an anchor for the electrical cord.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

A First Embodiment of a Peripheral Input Device Having a Retractable Cord

Figure 1A:
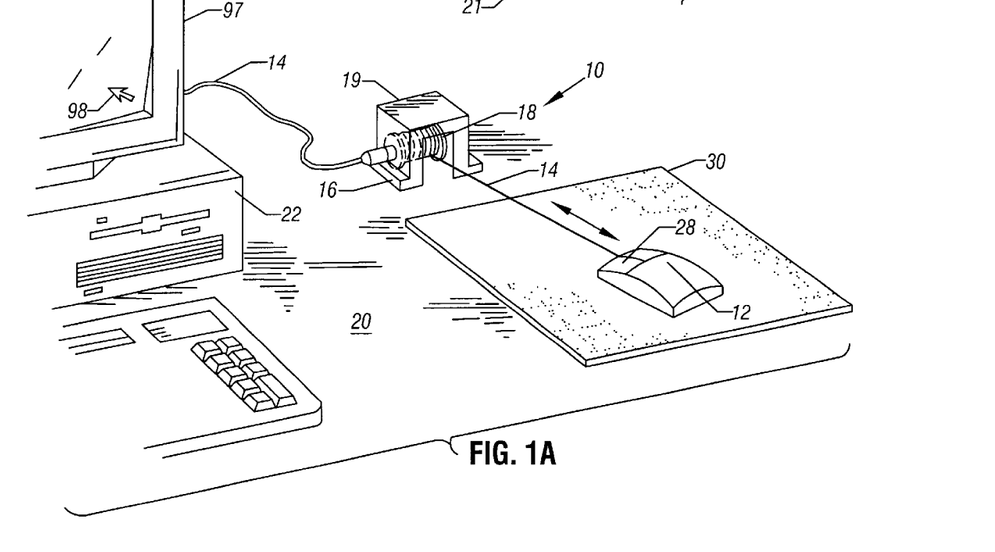
FIGS. 1A–1B illustrate a first embodiment of a peripheral input device constructed and operated in accordance with the present invention.
Figure 1B:
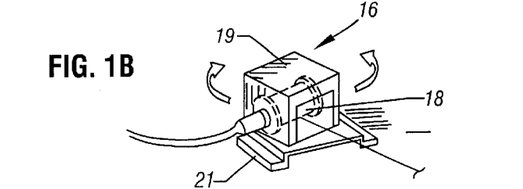
Figure 3:
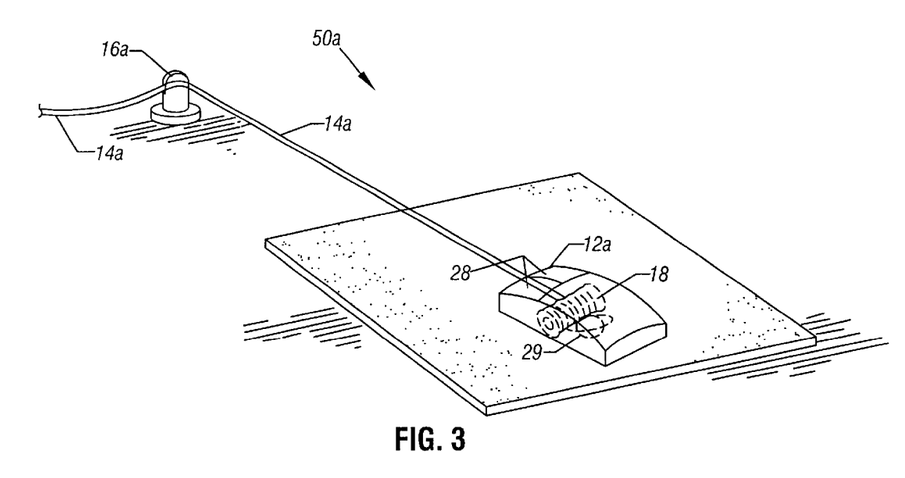
FIGS. 3–4 illustrate a second embodiment also constructed and operated in accordance with the present invention.
Figure 4:
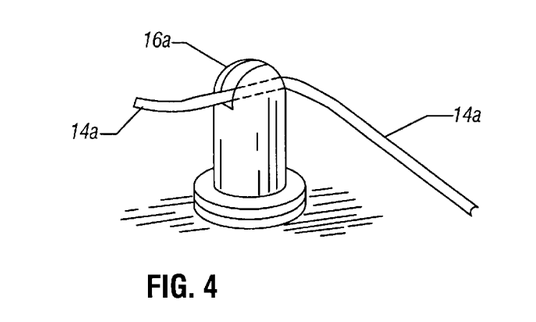

FIGS. 1A–1B illustrate a first embodiment of a peripheral input device 10 constructed and operated in accordance with the present invention. The device 10 includes a body 12, an electrical cord 14 operably connected to the body 12, an anchor 16 for the electrical cord 14, and a spool 18 biased to rotate and retract the electrical cord 14 as discussed more fully below relative to FIGS. 6–7. In the particular embodiment illustrated, the spool 18 is rotatably mounted in the housing 19 of the anchor 16. Note, however, that the spool 18 need not necessarily be mounted in the anchor 16 to practice the invention as illustrated by the embodiment of FIGS. 3–4 discussed below. Further, in some embodiments not shown, the housing 19 might be sufficiently large to house the body 12 when not in use and the electrical cord 14 is fully retracted.

The anchor 16 in the embodiment of FIGS. 1A–1B is affixed to the desktop 20. The manner in which the anchor 16 is affixed is not material to the invention provided the anchor 16 is sufficiently affixed so that the user may draw the cord 14 from the spool 18 while normally operating the input device 10. Thus, the anchor 16 may be affixed by an adhesive or a fastener. In one particular embodiment, the anchor 16 is affixed using a flexible hook-and-loop fastener (not shown) such as that sold under the mark Velcro®. One strip of the fastener may be adhered to the bottom of the anchor 16 and the other to the desktop 20.

The housing 19 in the embodiment of FIGS. 1A–1B is affixed to the desktop 20 in a manner permitting the housing 19 to rotate in a horizontal plane as shown in FIG. 1B. More particularly, the housing 19 is rotatably mounted to a base 21 that is affixed to the desktop 20. However, this is not necessary to the practice of the invention. The housing 19 may, in some alternative embodiments, be rigidly affixed to the desktop 20 in a manner prohibiting such lateral rotation.

Figure 2A:
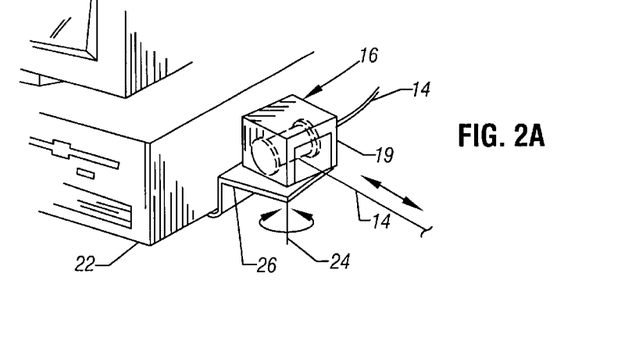
FIGS. 2A and 2B depict variations on the embodiment of FIGS. 1A–1B.

FIG. 2A illustrates one variation of the embodiment of FIGS. 1A–1B in which the anchor 16 is affixed to the chassis of the computer 22. This particular embodiment also provides rotation in a horizontal plane about the axis 24 as the housing 19 of the anchor 16 is rotatably mounted to the bracket 26 by which the anchor 16 is affixed to the computer 22. Thus, this embodiment provides some flexibility in positioning the anchor 16 while still anchoring the electrical cord 14.

Figure 2B:
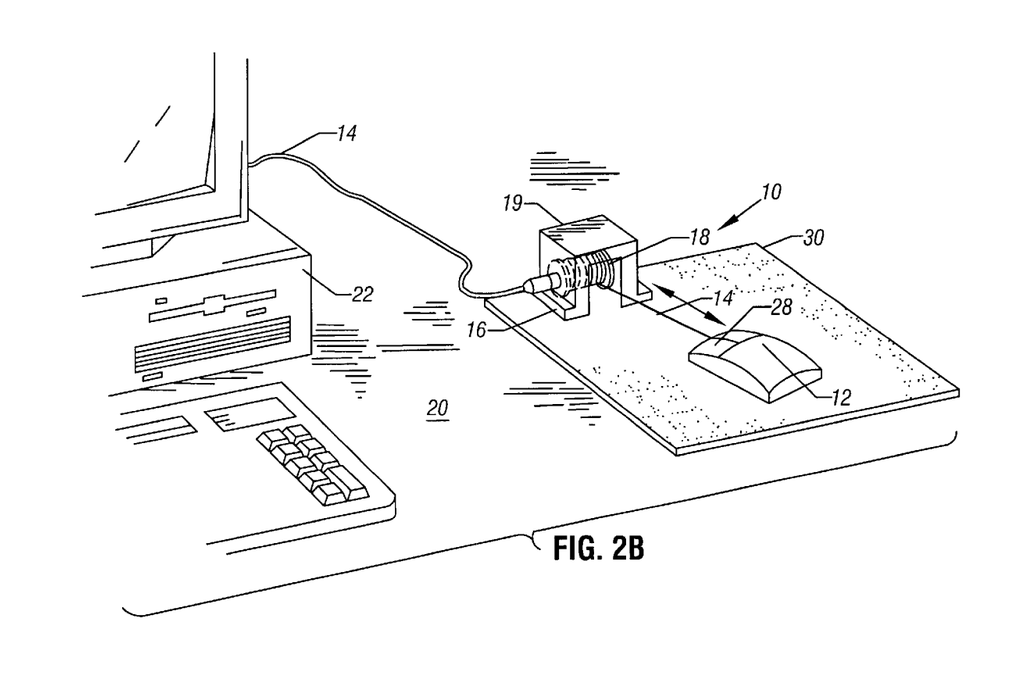

FIG. 2B illustrates a second variation on the embodiment of FIGS. 1A–1B in which the anchor 16 is affixed to the mouse pad 30. In some embodiments, this variation may include a housing 19 rotatable in a horizontal plane in a manner similar to the embodiment of FIG. 1B. The anchor 16 may also be affixed to the desktop 20 through the mouse pad 30 such that the anchor is affixed to both the desktop 20 and the mouse pad 30 in some embodiments. Note that the desired manner of affixation may vary depending on whether the anchor 16 is affixed to the mouse pad 30 as shown in FIG. 2B, to the chassis of the computer 22 as shown in FIG. 2A, or the desktop 20 as shown in FIGS. 1A–1B.

Returning to FIGS. 1A–1B, the peripheral input device 10 furthermore includes an input mechanism 28 on the body 12. The device 10 in this particular embodiment is a mouse, and so the input mechanism includes two buttons on the top of the body 12 and a trackball (not shown). The construction and operation of the body 12 and the input mechanism 28 in this particular embodiment is the same as for a conventional mouse. Thus, the construction and operation of the body 12 and input mechanism 28 will be well known to those in the art having the benefit of this disclosure. Note, also, that some embodiments in which the input device 10 is a mouse a mouse pad 30 might be employed.

A Second Embodiment of a Peripheral Input Device Having a Retractable Cord

FIGS. 3–4 illustrate a second embodiment 50a constructed and operated in accordance with the present invention. In this particular embodiment, the spool 18 is mounted within the body 12a of the device 50a rather than in the anchor 16a. The device 50a is otherwise analogous to the device 10 of FIGS. 1A–2, with like parts bearing like numbers. Again, the particular embodiment 50a illustrated in FIGS. 3–4 is a mouse. The body 12a must be modified relative to that of a conventional mouse to rotatably mount the spool 18 therein as discussed more fully below.

The body 12a is otherwise constructed in accordance with a conventional mouse design. Thus, the mouse 12a includes, as an input mechanism 28, the buttons and the trackball 29. The buttons are biased in the upward direction and are depressed by the user to input data. The trackball 29 is rotatably mounted in the body 12a and extends through an aperture in the bottom of the body 12a. The body 12a also houses electro-mechanical circuitry to convert the trackball's movement into electronic data in a manner well known to the art. The operation of this input mechanism in this particular embodiment is well known and appears in such elementary texts as David Macaulay, *The Way Things Work*, pp. 346–47 (Houghton Mifflin Co. 1988) (ISBN 0-395-42857-2) and Ron White, *How a Computer Works*, pp. 106–09 (Ziff-Davis Press 2d Ed. 1993) (ISBN 1-56276-344-X).

A Third Embodiment of a Peripheral Input Device Having a Retractable Cord

Figure 5:
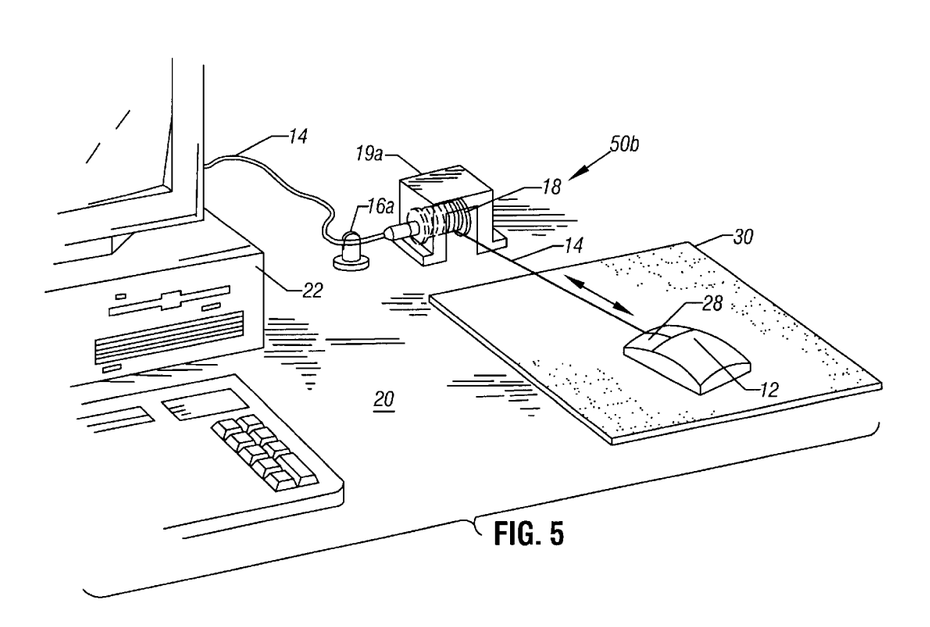
FIG. 5 illustrates a third embodiment also constructed and operated in accordance with the present invention.

FIG. 5 illustrates a third embodiment 50b constructed and operated in accordance with the present invention. In this particular embodiment, the spool 18 is mounted within housing 19a rather than in the anchor 16 a or the body 12. The anchor 16a is affixed to the desktop 20, but the housing 19a "floats" in that it is not affixed to desktop 20 or mouse pad 30. The device 50b is otherwise analogous to the device 10 of FIGS. 1A–2B and the device 50a of FIGS. 3–4, with like parts bearing like numbers. Again, the particular embodiment 50b illustrated in FIG. 5 is a mouse, but the invention is not so limited. Note also that the electrical cord 14 could be anchored at the back of the computer 22, thereby eliminating the need for anchor 16a.

Figures 6, 7:
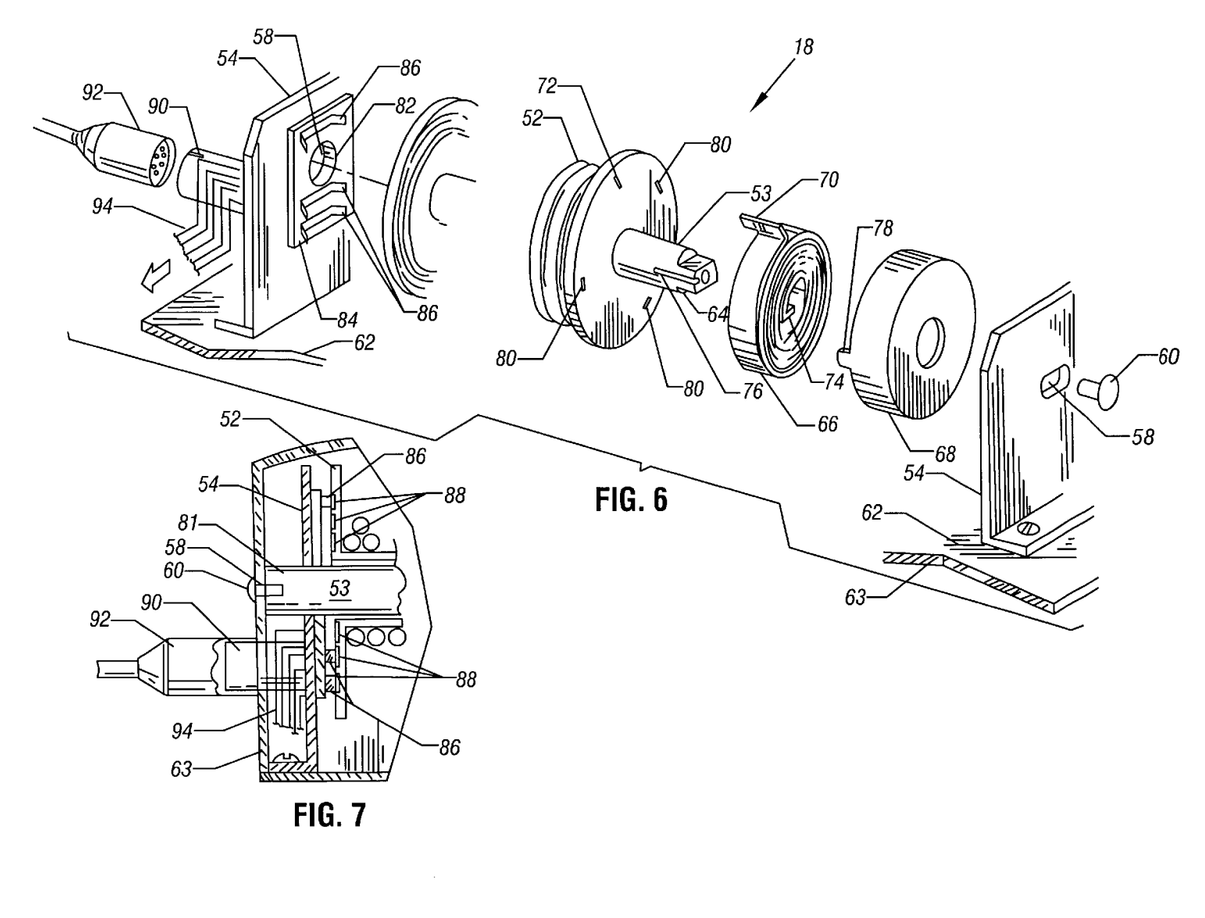
FIGS. 6–7 depict, in an exploded and an assembled view, respectively, one embodiment of a spool such as may be employed in accordance with the present invention.
Figure 8:
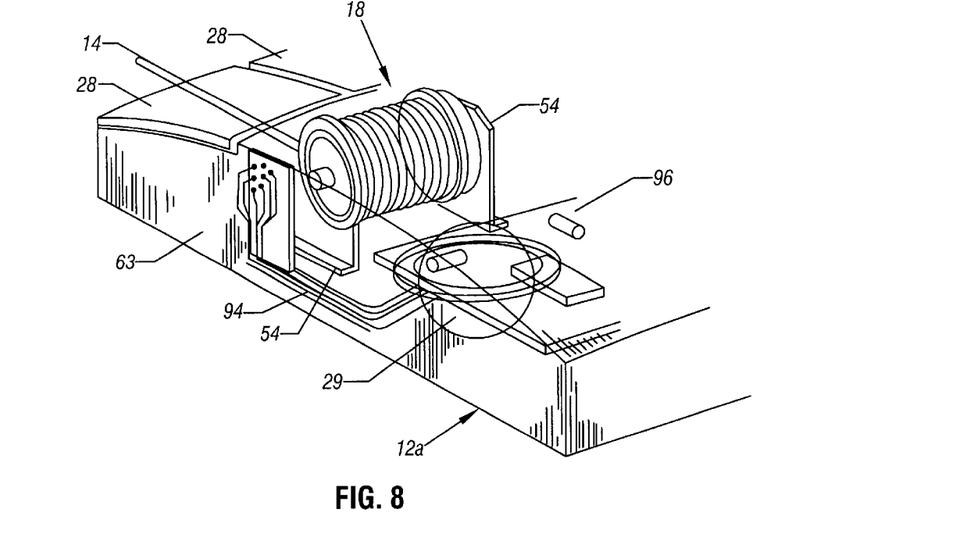
FIG. 8 depicts how the spool of FIGS. 6–7 may be employed in the embodiment of FIGS. 3–4.
Figure 9:
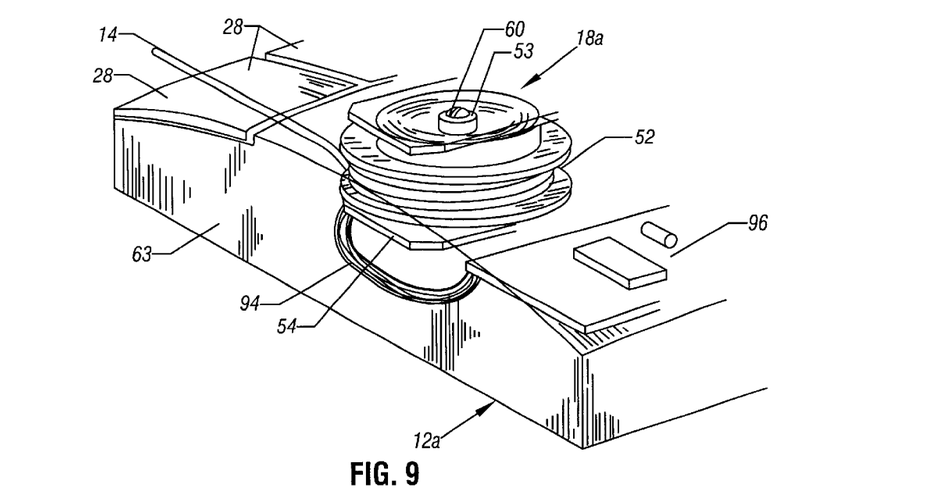
FIG. 9 depicts a spool alternative to that in FIGS. 6–8.

A Spooling Mechanism as may be Used in the Above Embodiments of the Peripheral Input Device FIGS. 6–8 and FIG. 9 illustrate spooling mechanisms as may be used to retract the electrical cord 14 as set forth above. More particularly, FIGS. 6–7 depict, in an exploded and an assembled view, respectively, one embodiment 18 of a spool such as may be employed in accordance with the present invention. FIG. 8 depicts how the spool 18 of FIGS. 6–7 may be employed in the embodiment of FIGS. 3–4. FIG. 9 depicts a spool alternative 18a to that in FIGS. 6–8.

Turning now to FIGS. 6–7, a first embodiment of the spool 18 is shown. The spool 18 includes a drum 52 rotatably mounted on a shaft 53 affixed to a stand 54 on one end, as shown in FIG. 6, and the side of a structure 63, as shown in FIG. 7. If the spool 18 is employed in the embodiment of FIG. 1A–1B, the structure 63 is the housing 19. If the spool 18 is employed in the embodiment of FIGS. 3–4, then the structure 63 is the body 12a.

Each end of the shaft 53 may be affixed by a fastener 60 through an aperture 58 in the stand 54 and in the structure 63 such that the shaft 53 does not rotate. However, both ends of the shaft 53 are supported by a respective stand 54 and, in some embodiments, both ends of the shaft 53 may be affixed to a stand 54. The stands 54 are affixed to the base 62 of the structure 63, which is the housing 19 in the embodiment of FIGS. 1A–1B or the body 12a for the embodiment of FIGS. 3–4.

Referring now to FIG. 6, one end 64 of the shaft 53 extends also through a clock spring 66 and a cover 68 before being secured to the stand 54 by the fastener 60. A tab 70 at one end of the clock spring 66 inserts into a slot 72 in the drum 52 and a tab 74 at the other end of the clock spring 66 insert into a slot 76 in the shaft 53. The cover 68 encloses the clock spring 66 is mounted to the drum 52 by inserting a plurality of tabs 78 extending from the cover 68 into slots 80 in the drum 52.

The clock spring 66 biases the spool 18 to retract the electrical cord 14 and operates between the drum 52 and the shaft 53. As the mouse 12 is drawn with sufficient force, the electrical cord 14 spools off the drum 52 and tensions the clock spring 66. When the mouse 12 is released or when insufficient force is exerted through the mouse 12, the tension in the clock spring 66 is released and rotates the drum 52 on the stationary shaft 53 to retract the electrical cord 14. Thus, the workspace is freed of any undesirable slack in the electrical cord 14. Note that some embodiments not shown might employ a ratchet to control the retraction of the electrical cord 14.

Referring now to FIG. 7, a second end 81 of the stationary shaft 53 extends through an aperture 82 in a contact plate 84 before it is affixed to the structure 63. The contact plate 84 includes contact elements 86 that are electrically coupled to the contact rings 88 on the corresponding end of the drum 52 when the spool 18 is assembled. When the spool 18 is employed in the embodiment of FIGS. 1A–1B, the contact elements 86 are also electrically coupled to the male connector 90 that mates with the female connector 92. When the spool 18 is employed in the embodiment of FIGS. 3–4, the contact elements 86 are electrically coupled to the leads 94 which may be directly routed to the electrical circuitry.

The use of the contact elements 86 and the contact rings 88 thereby maintains the electrical continuity of the signal path between the mouse 12, or 12a, and the computer 22 while enabling the drum 52 to rotate freely about the stationary shaft 53. FIGS. 1A–1B illustrate how the spool 18 might be mounted in that particular embodiment using the coupling between the male connector 90 and the female connector 92. FIG. 8 illustrates how the spool 18 might be housed in the mouse 12a of FIGS. 3–4 such that the lead 94 are routed to the electro-mechanical elements 96.

Finally, FIG. 9 illustrates an alternative spool 18a in which the drum rotates in a horizontal plane rather than the vertical plane of FIGS. 6–8. This particular embodiment is otherwise similar to that of FIGS. 6–8. Still other techniques might be used to retract and spool the electrical cord 14.

A Method for Inputting Data Into a Computer Using a Peripheral Input Device Having a Retractable Cord A peripheral input device having a retractable cord, such as the device 10 of FIGS. 1A–1B or the device 50 of FIGS. 3–4, may be used to enter data into a computer. Referring now to FIGS. 1A–1B for illustrative purposes, the device 10 may be so used by first anchoring the electrical cord 14 connecting the body 12 of the peripheral input device 10 to the computer 22. The body 12 of the peripheral input device 10 may then be positioned by the user. As the body 12 of the peripheral input device 10 is positioned, the slack in the electrical cord 14 is retracted.

Anchoring the electrical cord includes anchoring the electrical cord to a work surface such as the desktop 20, the mouse pad 30, or both the desk top 20 and the mouse pad 30. The electrical cord 14 may alternatively be anchored to the chassis of the computer 22 as in the embodiment of FIG. 2A or in some other suitable manner. The anchor 16 by which the electrical cord 14 is anchored in the particular embodiment of FIGS. 1A–1B may be affixed in any suitable manner as discussed above, including, but not limited to, adherence, fastening, or both.

In the particular embodiment of FIGS. 1A–1B, the peripheral input device 10 is a mouse. Consequently, positioning the peripheral input device 10 includes positioning a mouse and, typically, positioning a cursor 98 displayed on the monitor 97 of the computer 22. However, the invention is not so limited as the invention may be used with other types of peripheral input devices. An exemplary alternative type of peripheral input device is a keyboard, although other types may be suitable.

Retracting slack in the electrical cord 14 is also highly implementation dependent. The slack may be retracted into the peripheral input device as in the case of the embodiment in FIGS. 1A–1B. The slack may alternatively be retracted into an anchor as with the embodiment of FIGS. 3–4 or into a floating structure as in the embodiment of FIG. 5. Still other suitable alternatives might be employed.

Remarks

The particular embodiments disclosed above are illustrative only, as the invention may be modified and practiced in different but equivalent manners apparent to those skilled in the art having the benefit of the teachings herein. For example, the input mechanism may vary depending on the particular implementation of the invention. A keyboard, for example, has a plurality of buttons, generally referred to as "keys," biased in an upward direction but typically not a trackball. However, some keyboards do include trackballs and/or joysticks. Furthermore, a joystick will have a different input mechanism from those discussed above. Each of these variations and their implementation will be apparent to those in the art having the benefit of this disclosure.

Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A peripheral input device usable with a computer, comprising:

a body including an input mechanism to receive input for the computer;

an electrical cord operably connected to the body and adapted to be connected to the computer to transmit the input from the input mechanism to the computer;

a spool biased to rotate and automatically retract the electrical cord without further user interaction to remove slack in the cord as the body moves to generate at least part of the input, the spool being rotatably mounted in the body; and an anchor for the electrical cord.

2. The peripheral input device of claim 1, wherein the input mechanism includes at least one of:

a track ball rotatably mounted in the body and extending through an aperture in a bottom of the body; and a button on a top of the body.

3. The peripheral input device of claim 1, wherein the spool rotates in a horizontal plane.

4. The peripheral input device of claim 1, wherein the spool rotates in a vertical plane.

5. The peripheral input device of claim 1, wherein the spool is not ratcheted.

6. A system usable with a computer, comprising:

a body;

an input mechanism;

an electrical cord operably connected to the body and adapted to be connected to the computer to transmit the input from the input mechanism to the computer;

a spool biased to rotate and automatically retract the electrical cord without further user interaction to remove slack in the cord as the body moves to generate at least part of the input, the spool being rotatably mounted in the body; and an anchor for the electrical cord.

7. The system of claim 6, wherein the input mechanism includes at least one of:

a track ball rotatably mounted in the body and extending through an aperture in a bottom of the body; and a button on a top of the body.

8. The system of claim 6, wherein the spool rotates in a horizontal plane.

9. The system of claim 6, wherein the spool rotates in a vertical plane.

10. The system of claim 6, wherein the spool is not ratcheted.

* * * * *

UNITED STATES PATENT AND TRADEMARK OFFICE
CERTIFICATE OF CORRECTION

PATENT NO.     : 6,421,044 B2
DATED          : July 16, 2002
INVENTOR(S)    : Stephen C. Murphy It is certified that error appears in the above-identified patent and that said Letters Patent is hereby corrected as shown below:

<u>Title page,</u>
Please correct the "*Attorney, Agent, or Firm*" to -- Trop, Pruner & Hu, P.C. --.

Signed and Sealed this

Twenty-ninth Day of October, 2002

Attest:

Attesting Officer

JAMES E. ROGAN
*Director of the United States Patent and Trademark Office*